No. 638,965. Patented Dec. 12, 1899.
W. D. HOFFMAN.
SPEED CHANGING MECHANISM.
(Application filed May 25, 1899.)

(No Model.) 2 Sheets—Sheet 1.

No. 638,965. Patented Dec. 12, 1899.
W. D. HOFFMAN.
SPEED CHANGING MECHANISM.
(Application filed May 25, 1899.)
(No Model.) 2 Sheets—Sheet 2.

Witnesses
Gustav F. Magnitzky
Charles F. Agan

Inventor.
William D. Hoffman
by Crosby & Gregory.
Attys.

THE NORRIS PETERS CO., PHOTO-LITHO., WASHINGTON, D. C.

UNITED STATES PATENT OFFICE.

WILLIAM D. HOFFMAN, OF NEWTON, MASSACHUSETTS, ASSIGNOR TO THE CONSOLIDATED MACHINE SPECIALTY COMPANY, OF BOSTON, MASSACHUSETTS.

SPEED-CHANGING MECHANISM.

SPECIFICATION forming part of Letters Patent No. 638,965, dated December 12, 1899.

Application filed May 25, 1899. Serial No. 718,180. (No model.)

*To all whom it may concern:*

Be it known that I, WILLIAM D. HOFFMAN, of Newton, county of Middlesex, and State of Massachusetts, have invented an Improvement in Speed-Changing Mechanism, of which the following description, in connection with the accompanying drawings, is a specification, like letters and figures on the drawings representing like parts.

This invention relates to speed-changing mechanism adapted to be applied to machine-tools, printing-presses, laundry-machines, motor-carriages, or other apparatus wherein it is desirable to vary their speed of operation without varying the speed of the main actuator or motive power.

My invention has for its main object the production of a strong and durable apparatus, readily adaptable to use under various conditions, provided with ample and sufficiently heavy bearings to prevent undue vibration of moving parts, and having such simplification of construction that cost of production is greatly reduced.

The mechanism hereinafter to be described belongs to that general type of speed-changing mechanism wherein the driving and driven members have their opposed faces annularly grooved, with one or more friction-wheels interposed between and adapted to engage the grooved faces of said members, variations in the angular position of the friction wheel or wheels relative to the said members operating to vary the relative speed of the latter, the friction-wheels being mounted in a peculiar way for a purpose to be described.

Figure 1:
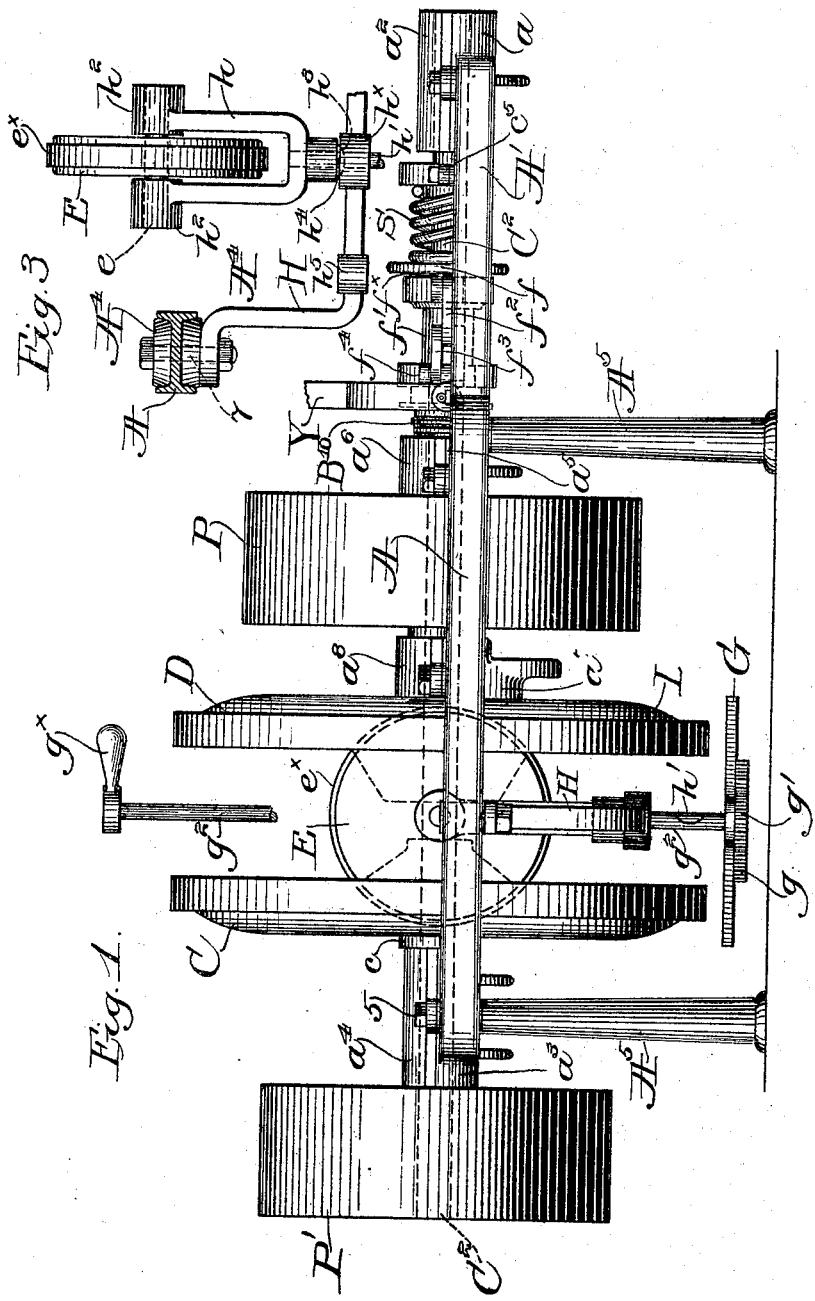
Figure 2:
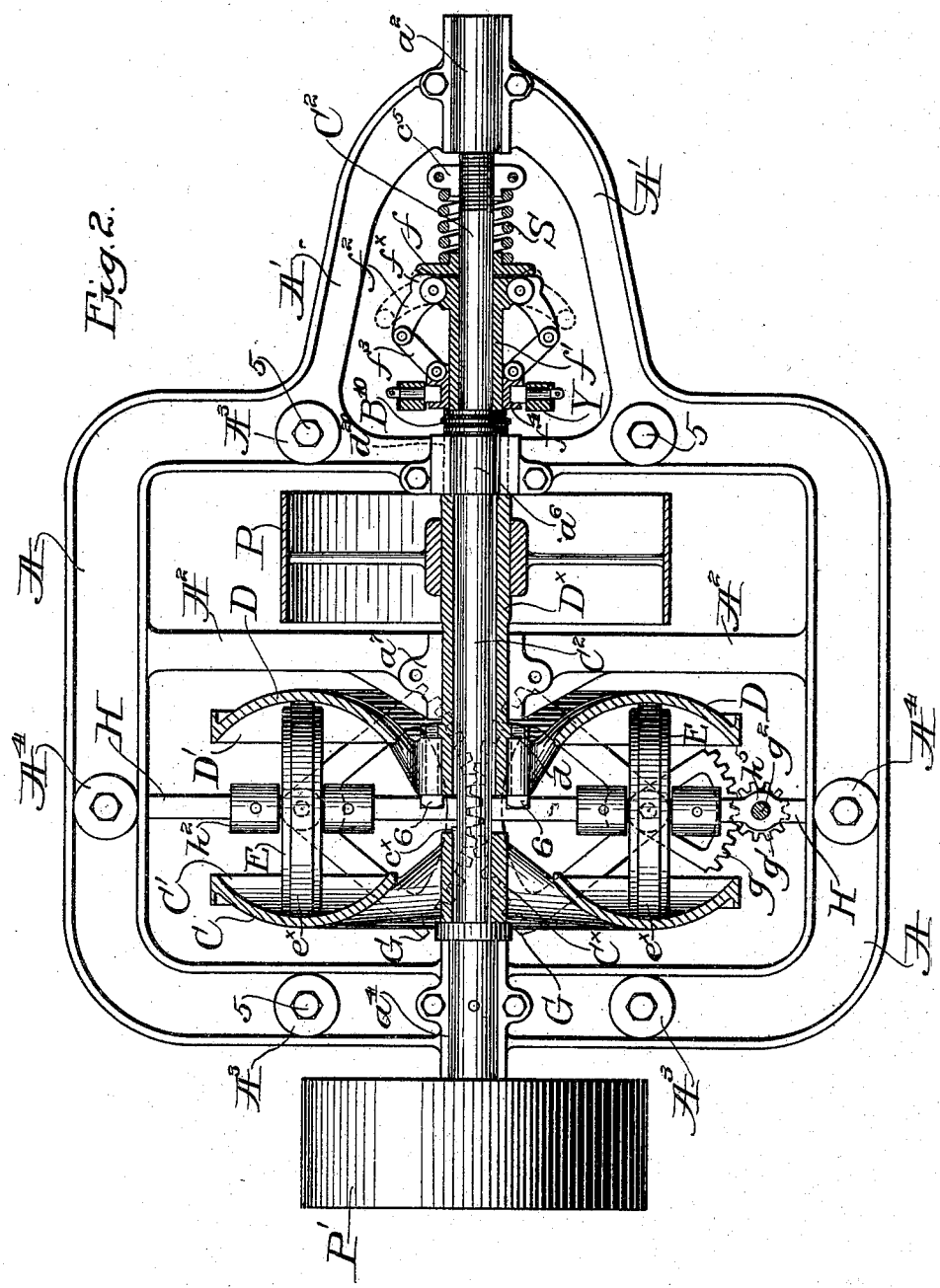

Figure 1 is a side elevation of a speed-changing mechanism embodying my invention. Fig. 2 is a top or plan view thereof, the driving and driven members and some other parts of the mechanism being shown in section; and Fig. 3 is a detail view of one of the friction-wheels and its support.

Referring to Fig. 2, the main frame A of the mechanism is shown as substantially rectangular in plan, with an open bracket A' extended from one end thereof and having integral therewith a long bearing member $a$, provided with a removable cap $a^2$. As herein shown, this bearing is on a line preferably midway between the sides of the main frame, and in alinement therewith are two other bearing members $a^3$ and $a^5$, formed integral with the ends of the frame, the bearing $a^3$ being made quite long for a purpose to be described. Suitable detachable caps $a^4$ and $a^6$ are provided for said bearings, and a fourth bearing $a^7$ is mounted on or forms a part of a cross-girth $A^2$ of the main frame, the cap $a^8$ being omitted in Fig. 2.

The main frame is provided with suitable bosses $A^3$ and $A^4$, the former on the ends of the frame and on the upper and lower face thereof, the ends of the said bosses being milled to provide firm and flat seats for pillars or standards $A^5$, Fig. 1, secured to the frame by suitable bolts 5, extended through holes in the bosses $A^3$.

In Fig. 1 the apparatus is shown as supported above the floor by the standards; but if it is desired to suspend the frame from a ceiling the hangers or brackets engage the bosses at the top of the frame and are bolted thereto from beneath, so that the apparatus can be mounted either way, as may be most convenient, or on a side wall.

The driving member D is shown as a shell-casting having an annular groove D' on its inner face, and in order to simplify the construction said member is herein bolted, as at 6, Fig. 2, to the annular flange $d$ of a long sleeve $D^\times$, mounted to rotate in the bearings $a^5$ and $a^7$ and projecting beyond the inner end of the latter to receive the driving member D.

Between the bearings a power-transmitting device (herein shown as a belt-pulley P) is secured to the sleeve $D^\times$, which forms an elongated hub for the driving member, said sleeve being rotated continuously by a belt or other desired connection from any suitable source of power. (Not shown.) The hub of the driving member is thus amply and firmly supported in two large and well-separated bearings, preventing undue vibration and providing a very strong and durable construction, and with the moving portions so constructed that they can be easily lubricated.

The driven member C is very similar in its construction to the driving member, having an annular groove C' on its inner face, Fig. 2, its hub $C^\times$ being secured by a suitable key $c^\times$ to a long shaft $C^2$, rotatably mounted at or near its ends in the extreme bearings $a$ and $a^3$, with a transmitting device (herein shown as a pulley P') fast on its end extended beyond the bearing $a^3$, a collar $c$, fast on the shaft at the inner end of the bearing, in the present embodiment of my invention coöperating with the pulley to prevent longitudinal movement of the shaft and also serving to prevent the leakage of oil to the grooved or concave faces of the members C and D. The long hub $D^\times$ and its flange $d$ prevent the leakage of oil from the bearing $a^7$ to the inner faces of the driving and driven members.

All of the bearings hereinbefore referred to are purposely made large and afterward lined with Babbitt or other suitable antifriction material to reduce friction and also obviate expensive turning of the bearings to accurately fit the parts rotatably mounted therein.

A substantially U-shaped hanger H is secured at its ends, as by bolts 7, to the bosses $A^4$ at the opposite sides of the main frame, the hanger passing between the members D and C, as shown in Fig. 1, and having enlarged annular portions $h^\times$ (see Fig. 3) to form bearings for the depending shafts $h'$, secured to like yokes $h$, two being herein shown, located at opposite sides of the shaft $C^2$. The arms of each yoke are preferably provided with enlarged bearing-heads $h^2$ to receive a stud or pin $e$, forming the axis of rotation of a friction wheel or disk E, its periphery being preferably provided with a contact-surface $e^\times$ of leather, indurated fiber, or other suitable friction material.

I have herein shown two friction-wheels interposed between and adapted to engage the grooved faces of the members D and C, as clearly shown in Fig. 2, and I prefer to slightly cup out the top of the bearing $h^\times$, as shown in dotted lines at $h^3$, Fig. 3, to receive the rounded lower end $h^4$ of the yoke and support the latter, while permitting it to tip slightly in the cup, thus allowing its particular friction-wheel to assume the proper position intermediate the members C and D in order to firmly contact therewith. The shafts $h'$ extend beyond the peripheries of the members D and C and have attached means for oscillating or turning the yokes about the said shafts as fulcra to thereby change the angle of the friction-wheels relative to the driving and driven members when it is desired to vary the relative speed of such members.

Herein I have shown such shifting means as comprising intermeshing segmental gears G G, one of the same having an oppositely-extended and smaller segment-gear $g$ in mesh with a pinion $g'$, fast on a controlling-shaft $g^2$, mounted in a bearing $h^5$ on the hanger H and provided with a suitable handle $g^\times$, Fig. 1.

In the position shown in Fig. 2 the friction wheels or disks E are parallel to each other and to the shaft $C^2$, and the member C will be rotated at the same speed as the driving member D, but in the opposite direction. To increase the speed of the driven member, the wheels are turned on their fulcra $h'$ to cause them to engage the driving member nearer its periphery, while reverse turning movement of the wheels or toward the axis of said driving members will reduce the speed of the driven member relative thereto. In order to press said members toward each other and to mutually engage with the friction wheel or wheels E, I have provided simple yet effective means, including a single thrust-bearing, whereby the range of usefulness and the adaptability of the apparatus are greatly enlarged. A clamp-collar $c^5$, secured to the shaft $C^2$ near the inner end of the bearing $a$, forms an abutment for one end of a strong spring S, surrounding the shaft and at its other end bearing on one member $f$ of a clutch mounted on the shaft, the other member $f'$ being shown as a sleeve also loose on the shaft. An end-thrust ball-bearing $B^{10}$ of usual construction is interposed between the sleeve $f'$ and the reduced end $d^{20}$ of the sleeve-hub $D^\times$, projecting beyond the bearing $a^5$. (See dotted lines, Fig. 2.) The clutch-sleeve has rocker-arms $f^2$ pivoted thereupon, with cams $f^\times$, adapted to engage the member $f$, said arms being pivotally connected by links $f^3$ with an annularly-grooved collar $f^4$, mounted to slide on the sleeve and moved by a yoke Y of usual construction. When the collar $f^4$ is moved to the right, Fig. 2, the arms $f^2$ are rocked to press the cams against the disk-like member $f$, movement of the latter being resisted by the spring S while tending to draw the shaft $C^2$ to the right, so that as a result the sleeve $f'$ will be moved to the left, and it, acting through the thrust-bearing $B^{10}$, forces the hub $D^\times$ and driving member D to the left against the friction wheel or wheels E, the latter being brought into engagement with the driven member C to thereby effect the rotation of the latter. The spring S acts thus to maintain the members D and C in firm yet yielding contact with the friction-wheels when the mechanism is in operation, the tipping of the wheel-support at the joint $h^3$ $h^4$ coöperating therewith to assist in attaining such result. Manifestly the end thrust is thus provided for by the single bearing $B^{10}$, so that there is no end thrust on any of the other bearings, the thrust on opposite sides of the ball-bearing $B^{10}$ being equal and thus neutralized.

By the construction herein described the speed-changing mechanism can be cut into or made a part of a continuous line of shafting, if desired, by coupling the ends of the shaft $C^2$ to the line-shaft, in which case the pulley P' may be dispensed with and the speed of the shafting can be varied as desired. On the other hand, the line-shaft may be utilized to drive the shaft $C^2$ by being coupled thereto and the variable speed transmitted through the pulley P to the particular mechanism to be driven.

Should it be found desirable, the shaft $C^2$ may be extended at one or both ends and one or more pulleys or other transmitting devices, such as gears, mounted thereon, and it will be also manifest that the mechanism to be driven can be coupled directly to the shaft $C^2$ of the speed-changing mechanism herein shown.

When the clutch device $f f'$ is operative, it will in the construction shown herein rotate as a whole with the shaft $C^2$, and for this reason I prefer under ordinary circumstances to make the member D the driver.

Should there be any reason for reversing the functions of the members D and C, however, it can be done, as hereinbefore described, and it will be manifest also that the sleeve can be held from longitudinal movement rather than the shaft.

The mechanism herein described is simple, strong, and durable in construction, requiring very little machining or other finishing, hence is capable of construction at a low cost, and the parts which require lubrication are readily accessible and adapted for the purpose.

Having described my invention, what I claim, and desire to secure by Letters Patent, is—

1. Speed-changing mechanism comprising a driving and a driven member, the opposed faces thereof being annularly grooved, a sleeve-like hub secured to one, and a concentric shaft to the other, of said members, rigidly-connected bearings to support the shaft beyond the ends of and independent of the said hub, intermediate bearings for the latter, a friction-wheel interposed between the driving and driven members, a support for and to turn the wheel, and means to bring said members into engagement with the friction-wheel.

2. Speed-changing mechanism comprising a driving and a driven member, the opposed faces thereof being annularly grooved, a sleeve-like hub secured to one, and a concentric shaft to the other, of said members, bearings to support the shaft beyond and independent of the said hub, intermediate bearings for the latter, a transmitting device fast on said hub between its bearings, a friction-wheel interposed between the driving and driven members, a support for and to turn the wheel, and means to bring said members into engagement with the friction-wheel.

3. Speed-changing mechanism comprising a driving and a driven member, the opposed faces thereof being annularly grooved, a sleeve-like hub secured to one, and a concentric shaft to the other, of said members, bearings to support the shaft beyond and independent of the said hub, intermediate bearings for the latter, in which it is longitudinally movable, means to prevent longitudinal movement of the shaft, a friction-wheel interposed between the driving and driven members, a support for and to turn the wheel, and means, including an end-thrust bearing, to move the sleeve-hub longitudinally and maintain the driving and driven members in engagement with the friction-wheel.

4. Speed-changing mechanism comprising a driving and a driven member, the opposed faces thereof being annularly grooved, a sleeve-like hub secured to one, and a concentric shaft to the other, of said members, bearings to support the shaft beyond each end of and independent of the said hub, intermediate bearings for the latter, in which it is longitudinally movable, means to prevent longitudinal movement of the shaft, a clutch device mounted on the outer end of the shaft, a spring carried by the latter to act on one part of said clutch device, an end-thrust bearing interposed between the other part of said device and the adjacent end of the sleeve-hub, means to operate the clutch device, to effect relative lateral movement of the driving and driven members, a friction-wheel between the grooved faces thereof, and means to support and turn the wheel.

5. Speed-changing mechanism comprising a driving and a driven member, the opposed faces thereof being annularly grooved, a sleeve-like hub secured to one, and a concentric shaft to the other, of said members, bearings to support the shaft beyond each end of and independent of the said hub, intermediate bearings for the latter, a U-shaped hanger secured at its upturned ends to and extended transversely of the frame and passing between the driving and driven members, yokes mounted rotatably in the hanger, a friction-wheel rotatable in each yoke and adapted to engage the grooved faces of the driving and driven members, and means supported by the hanger below the driving and driven members to swing said yokes on their fulcra and thereby shift the wheels oppositely in unison.

6. Speed-changing mechanism comprising driving and driven members, having their opposed faces annularly grooved, a sleeve-like hub attached to one of said members, and a shaft attached to the other and extended through and beyond the said hub, a main frame having an extension at one end, four half-bearings integral with the frame and extension and in alinement, the outer ones supporting the shaft independently of and beyond the ends of the hub while the latter is rotatably mounted in the inner bearings, detachable cover members for said bearings, one or more friction-wheels interposed between the grooved faces of the driving and driven members and in engagement therewith, and means to support said wheels whereby they may be shifted, to vary the relative speed of the driving and driven members.

7. Speed-changing mechanism comprising a main frame having a bracket extension at one end, an elongated bearing carried by said extension, bearings mounted on the frame in alinement with each other and with the bearing carried by the extension, a shaft mounted in the endmost bearings, a concentric sleeve mounted in the inner bearings, a driving member secured to one and a driven member secured to the other, said members having their opposed faces annularly grooved, a friction-wheel interposed between and adapted to engage said grooved faces, a support for and to shift the friction-wheel, and means including a single thrust-bearing, to maintain said driving and driven members pressed toward each other.

8. In speed-changing mechanism, a main frame having a bracket extension integral therewith at one end and an integral cross-girth, bearings integral with the extension, cross-girth, and frame ends, and in alinement, hollow bosses on faces of the frame ends, the opposite ends of the bosses being machined to lie in parallel planes, and supporting-standards adapted to be seated upon and secured to either end of said bosses.

9. Speed-changing mechanism comprising a driving and a driven member, the opposed faces thereof being annularly grooved, a sleeve-like hub secured to one, and a concentric shaft to the other, of said members, independent bearings for the shaft and hub, and a thrust-bearing interposed between the shaft and the hub, combined with one or more friction-wheels interposed between the driving and driven members, and means to vary the angle thereof relatively to said members, to alter their relative speed.

10. Speed-changing mechanism comprising a driving and a driven member, the opposed faces thereof being annularly grooved, a sleeve-like hub secured to one, and a concentric shaft to the other, of said members, lateral bearings for the hub and shaft, a collar on the latter, an end thrust-bearing interposed between the collar and the adjacent end of the hub, means to move said shaft and hub in opposite directions longitudinally, to draw the driving and driven members together, and one or more friction-wheels interposed between said members, to engage the same when they are drawn together.

In testimony whereof I have signed my name to this specification in the presence of two subscribing witnesses.

WILLIAM D. HOFFMAN.

Witnesses:
JOHN C. EDWARDS,
AUGUSTA E. DEAN.